United States Patent [19]

Suchdev et al.

[11] Patent Number: 4,821,859
[45] Date of Patent: Apr. 18, 1989

[54] SELF ADJUSTING ROTOR FOR A CENTRIFUGAL CLUTCH

[75] Inventors: Lakhbir S. Suchdev, Charlotte, N.C.; Jack E. Campbell, Fort Mill, S.C.

[73] Assignee: Textron Inc., Providence, R.I.

[21] Appl. No.: 48,595

[22] Filed: May 11, 1987

[51] Int. Cl.$^4$ .................... F16D 43/18; F16D 13/75
[52] U.S. Cl. .................... 192/105 CD; 192/111 A
[58] Field of Search ............... 192/76, 103 B, 104 B, 192/105 BA, 105 CD, 111 A

[56] References Cited

U.S. PATENT DOCUMENTS

| | | | |
|---|---|---|---|
| 1,983,661 | 12/1934 | Frantz et al. | 192/105 CD |
| 2,670,829 | 3/1954 | Bruestle | 192/105 BA |
| 2,762,484 | 9/1956 | Hare | 192/105 CD |
| 3,712,438 | 1/1973 | Roddy et al. | 192/105 CD |
| 3,718,214 | 2/1973 | Newman | 192/105 CD |
| 3,945,478 | 3/1976 | Kellerman et al. | 192/105 CD |
| 4,016,964 | 4/1977 | Dietzsch et al. | 192/105 CD |

FOREIGN PATENT DOCUMENTS

| | | | |
|---|---|---|---|
| 1035480 | 7/1958 | Fed. Rep. of Germany | 192/105 CD |
| 1025315 | 4/1953 | France | 192/105 CD |

Primary Examiner—Leslie A. Braun
Assistant Examiner—Richard M. Lorence
Attorney, Agent, or Firm—Abraham Ogman

[57] ABSTRACT

The invention is directed to a self regulating rotor for a centrifugal clutch. The rotor is designed to reduce the clearance between the rotor and the the drum by being stressed above its elastic limit as speeds above the normal engagement speed whereby any enlargement of the rotor diameter that occurs above the elastic limit results in a permanent set.

3 Claims, 1 Drawing Sheet

SELF ADJUSTING ROTOR FOR A CENTRIFUGAL CLUTCH

The present invention is directed to a rotor for a centrifugal clutch of the type widely used in power equipment such as chain saws to provide a driving connection between an engine and the chain.

Classically a centrifugal clutch comprises a rotor or driving member situated within a drum or driven member. In the chain saw application the rotor is connected to the engine drive shaft. A sprocket is connected to the drum of the clutch with the chain mounted on the sprocket.

At idle or at speeds below a predetermined speed of the engine the rotor rotates within the drum without making contact. As the engine speed increases the diameter of the rotor increases until it comes into contact with the drum. Above the predetermined speed there is sufficient friction between the rotor and the drum so that the former drives the latter.

Several types of centrifugal clutches are described in U.S. Pat. Nos. 2,670,829, 2,762,484, 3,718,214 and 4,016,964. Though the clutches described in these patents differ greatly in design they comprise a single rotor element. In several of the cited patents the rotor is formed from a single relatively thick piece of metal. In one of the cited patents the rotor is formed from a plurality of elements which are fastened together so that they act in unison as a single rotor element.

The clearance between the circumference of the rotor and the inside friction surface of the drum is an important factor. As the drum friction surface wears and increases, the clearance and the speed at which the rotor makes contact with the drum increases. As a consequence the speed at which the rotor and drum may slip also increases thus increasing the wear rate on the drum. It is thus clear that the wear is compounded as the clearance between the rotor and drum increases.

In two of the patents cited the rotors are configured in the widely used "S" shape. Through this discussion will involve the S shaped rotor it is understood that the principles of the invention may be incorporated into other configurations.

It is a object of the invention to provide a rotor for a centrifugal clutch which avoids the limitations and disadvantages of prior rotors.

It is still another object of the invention to maintain a constant engagement speed by reducing the excessive clearance between the rotor and its complementary friction surface created by wear or by inaccurately machined parts.

It is yet another object of the invention to maintain a constant engagement speed by controlling the properties of the rotor material.

It another object of the invention to provide a rotor element from a material which will exceed its elastic limit above a designated speed of rotation so as to permanently yield and enlarge the diameter of the rotor and thus narrow the clearance between the rotor and the drum.

It is another object of the invention to provide a self regulating rotor for a centrifugal clutch which permanently enlarges in response to excessive speeds to narrow the clearance between the rotor and its complementary friction surface e.g. a drum.

These objects and other objects and advantages of the present invention will appear more clearly from the following specification in connection with the accompanying drawing, in which FIG. 1 is a front view of a centrifugal clutch showing an S rotor situated within a drum.

Figure 1:
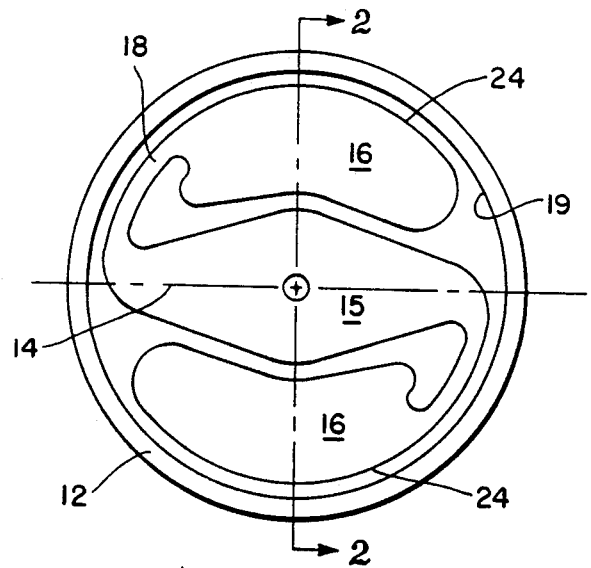
Figure 2:
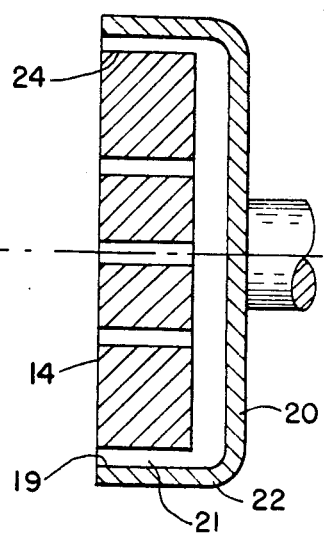
FIG. 2 is a side view of the FIG. 1 clutch taken along line 2—2.

Referring to FIG. 1 there is shown a centrifugal clutch 10 comprising a drum 12 and a rotor 14. In this case the rotor 14 is configured in the widely used "S" shape generically similar to the S rotor described in U.S. Pat. No. 4,016,964 mentioned above. The teachings relative to the generic configuration and operation of "S" type clutches are incorporated herein by reference.

The rotor 14 contains weights 16 with an arcuate peripheral edge 24 joined to central hub 15 by springs 18. The peripheral edge 24 conforms to the shape of the inside or friction surface of the drum 19.

The drum 12 includes a central disc 20 with a cylindrical rim 22 joined to the circumference of the disc 20.

In normal practice the rim would be a right cylinder so that the circumferential edge 24 of the rotor would comform to the rim fully to maximize the transfer of rotational force from the rotor 14 to the drum 12.

At idle a clearance 21 exists between the peripheral edge 24 and the friction surface 19. The engagement speed is determined by the clearance as the weights move outwardly as the speed of the rotor increases.

For small apparatus an idle speed of 3000 rpm.is common. A radial clearance of about 0.015 inches is generally provided and under these conditions one would design for an engagement speed of 3500 to 4000 rpm. Also under these conditions one can normally expect a slip speed -the speed at which the tool e.g. the chain in a chain saw or the blade in a brush cutter stalls while the engine and rotor continues to rotate-of about 4500–5000 rpm.

In the absence of a regulating device when the clearance becomes excessive due to wear between the rotor and the drum the engagement speed can increase to greater than 4000 rpm and of course the slip speed will increase as well. It is therefore highly advantageous to maintain a constant engagement speed as close to the design engagement speed as possible.

To maintain a constant or near constant engagement speed in accordance with the invention the diameter of the rotor is enlarged permanently in a controlled way to maintain the clearance within acceptable limits. The diameter of the rotor is enlarged by designing the rotor so that it will permanently yield above 4000 rpm and permanently remain in the enlarged diameter corresponding to 4000 rpm. Enlarging the diameter of the rotor maintains the clearance between the rotor and the drum.

Figure 3:
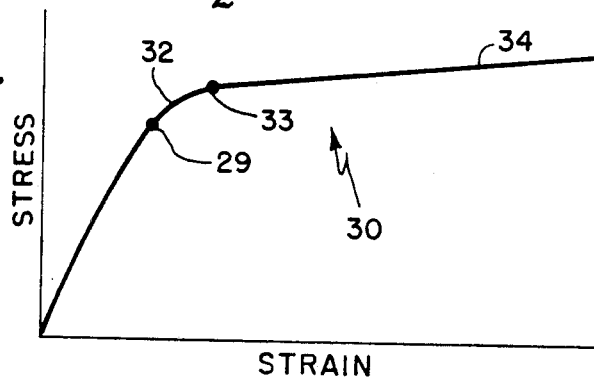
FIG. 3 is a universal stress-strain curve which will be useful in explaining the performance of the invention.

The way that this is accomplished can be best described by referring to FIG. 3 of the drawings.

FIG. 3 depicts a standard stress-strain curve 30 of the type found in any materials handbook. For a given stress the curve indicates the level of strain a material will experience. Below the elastic limit 33 of a material the strain is elastic. That is to say the strain is completely relieved if the stress is removed and the structure returns to its original unstressed dimensions.

Above the elastic limit 33 along the curve portion 34 a material undergoes a permanent set. For example if a rod is lengthened by a stress so that the strain occurs somewhere along the portion 34 of the curve 30 the rod will retain its strained length when the stress is removed.

In the illustrative structure described above and in accordance with the invention it is possible to design a rotor that will operate below the elastic limit 33 for normal engagement or normal slip speed. The diameter of the rotor will return to its original diameter when the engine returns to an idle speed.

However in the event there is serious wear between the rotor and the drum the engagement speed of the rotor will exceed 4000 rpm. For the example used, the strain in the springs 18 may be designed to exceed the elastic limit of the material at 4000 rpm for example. As a consequence the diameter of the rotor enlarged under the influence of the speeds exceeding 4000 rpm stays enlarged when the engine returns to idle speed. The clearance between the rotor peripheral edge and the friction surface of drum is thus maintained.

When the rotor speed is next increased to engage the drum a smaller clearance needs to be traversed. The rotor begins to enlarge as its speed is increased and the engagement speed tends toward the original design speed of less than 4000 rpm The engagement speed in this way can again be adjusted within acceptable limits, or less than 4000 rpm in the case illustrated.

Figure 4:
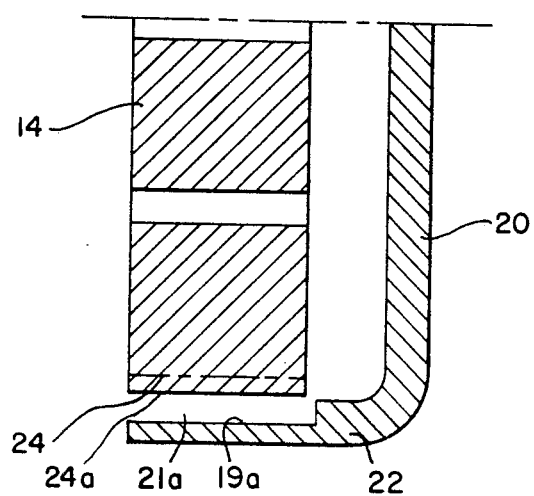
FIG. 4 is a partial section of a centrifugal clutch showing showing the placement of a rotor and a friction surface after the clearance has been adjusted.

FIG. 4 shows, in an exaggerated form, a worn friction surface 19a, a circumferential edge 24a spaced from the friction surface 19a by a clearance 21a. For purposes of illustrating the permanent set that takes place the original position of the circumferential edge 24 is shown in phantom outline.

The preferred rotor material is a stamping made from 1015 or 1018 mild steel having a yield point at 50 to 80 thousand psi. Any other material such as aluminum or special plastics having desirable mass and friction properties may be used providing it has an acceptable stress strain characteristic. Heat treated metals are generally not useful for small engine applications as they are generally too stiff for this function.

It is of course, to be understood that the present invention is, by no means limited to the specific showing in the drawing, but also comprises any modification within the scope of the appended claims.

We claim:

1. A method of reducing the clearance between a rotor and a driven member of a centrifugal clutch where the rotor's diameter expands as its speed is increased comprising the step of raising the speed of the rotor above a predetermined speed to enlarge the rotor diameter so as to exceed the elastic limit of the rotor material to induce a permanent set in the material at an enlarged diameter thereby reducing said clearance.

2. A self-regulating rotor for a centrifugal clutch wherein the rotor increases in diameter to engage and rotate a driven member of the clutch as the speed of rotation of the rotor increases, said rotor comprising:

means for allowing the rotor to expand elastically at a design engagement speed to maintain a design clearance between the rotor and the driven member said means further allowing the rotor to expand sufficiently at a speed above the design engagement speed when the clearance exceeds the design clearance to induce a permanent set in said rotor to permanently enlarge the rotor to return the clearance toward the design clearance.

3. A self-regulating rotor for a centrifugal clutch wherein the rotor increases in diameter to engage and rotate a given member of the clutch as the speed of rotation of the rotor increases, said rotor comprising:

a weight joined to a central hub by a spring means, said spring means being configured to operate below the elastic limit of its material at a design engagement speed to maintain a design clearance, said spring means further allowing the rotor to expand and stress the spring material above its elastic limit at a speed above the design engagement speed when the clearance between the rotor and the driven member exceeds the design clearance to induce a permanent set in said material to permanently enlarge the rotor to return the clearance toward the design clearance so as to exceed the elastic limit of the rotor material to induce a permanent set in the material at an enlarged diameter thereby reducing said clearance.

* * * * *